US010649150B1

(12) United States Patent
Liu et al.

(10) Patent No.: US 10,649,150 B1
(45) Date of Patent: May 12, 2020

(54) FIBER OPTIC CONNECTORS AND INTERFACES

(71) Applicant: AFL Telecommunications LLC, Duncan, SC (US)

(72) Inventors: Bin Liu, Chestnut Hill, MA (US); Scott Prescott, Belmont, NH (US); Dale Eddy, Gilford, NH (US); Shawn P. Collins, Pembroke, NH (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 16/220,451

(22) Filed: Dec. 14, 2018

(51) Int. Cl.
*G02B 6/38* (2006.01)

(52) U.S. Cl.
CPC .......... *G02B 6/381* (2013.01); *G02B 6/3849* (2013.01); *G02B 6/3863* (2013.01); *G02B 6/3869* (2013.01)

(58) Field of Classification Search
None
See application file for complete search history.

(56) References Cited

U.S. PATENT DOCUMENTS

| 2013/0163930 A1* | 6/2013 | Jian | G02B 6/36 385/60 |
|---|---|---|---|
| 2017/0322111 A1* | 11/2017 | Schell | G01M 11/3145 |
| 2018/0321446 A1* | 11/2018 | Arao | G02B 6/40 |

* cited by examiner

*Primary Examiner* — Jerry Rahll
(74) *Attorney, Agent, or Firm* — Dority & Manning, P.A.

(57) ABSTRACT

A fiber optic interface includes a first fiber optic connector and a second fiber optic connector. The first fiber optic connector has a ferrule extending from a distal end to a proximal end. The ferrule includes a contact interface defined at the proximal end of the ferrule. A first optical fiber extends within the ferrule and terminates at a first fiber end. The first fiber end is spaced apart from the contact interface towards the distal end of the ferrule by a distance of at least five microns. The second fiber optic connector includes a second optical fiber extending within the second fiber optic connector and terminating at a second fiber end. The ferrule of the first fiber optic connector includes an end face which faces the second fiber optic connector when mated and consists of a single face.

25 Claims, 14 Drawing Sheets

FIBER OPTIC CONNECTORS AND INTERFACES

FIELD

The present disclosure relates generally to fiber optic connectors, such as for connecting fiber optic cables to optical power meters for loss testing and other applications.

BACKGROUND

Light source power meter methods are generally known and utilized in the fiber optics industry to measure the insertion losses of the optical fibers in fiber optic cables. Typically, a fiber optic cable under test may be connected between two test cables. One test cable is connected to a light source, and the other test cable is connected to an optical power meter. Light is transmitted from the light source through the test cables and fiber optic cable to the power meter, and the loss in an optical fiber of the fiber optic cable is determined based on the measured power at the power meter and the power measured by referencing the light source to the power meter directly.

International standards require loss testing for both cable installation and maintenance, particularly in the case of use of multi-fiber connectors such as multi-fiber push-on ("MPO") connectors. Typically, the connector is connected to a power meter for such testing. In some cases, the power meter is equipped with a large area photodetector. In other cases, the power meter has a fiber array which mates with the connector. In the case of MPO connectors utilizing the former case, light from the MPO fibers is directed on the photodetector through free space. However, the gap between the end face of the connector and the detector must be small enough to capture all light. Therefore, a pinned (male) MPO connector cannot be connected to such a power meter and measured. For the latter case, light from the fibers of the MPO connector are guided through the contacted array, e.g., a mated MPO cable, and transmitted to the photodetector. However, due to manufacturing imperfections, mechanical misalignment errors, and other reasons, the insertion loss between the MPO connector and such an interface may significantly vary between fibers, and even between each connecting action. Therefore, these insertion loss variations could introduce substantial uncertainty in the loss measurement and compromise loss measurement accuracy.

Accordingly, improved fiber optic connectors are desired in the art. In particular, fiber optic connectors which facilitate accurate loss testing and address the above-stated issues would be advantageous.

BRIEF DESCRIPTION

Aspects and advantages of the invention will be set forth in part in the following description, or may be obvious from the description, or may be learned through practice of the invention.

In accordance with one embodiment, a fiber optic interface for optical testing is provided. The fiber optic interface includes a first fiber optic connector. The first fiber optic connector has a ferrule extending from a distal end to a proximal end along a longitudinal direction. The ferrule includes a contact interface defined at the proximal end of the ferrule. A first optical fiber extends within the ferrule along the longitudinal direction and terminates at a first fiber end. The first fiber end is spaced apart from the contact interface towards the distal end of the ferrule along the longitudinal direction by a distance. The distance is at least five microns. The fiber optic interface also includes a second fiber optic connector configured to mate with the first fiber optic connector. The second fiber optic connector includes a second optical fiber configured for optical communication with the first optical fiber when the second fiber optic connector is mated with the first fiber optic connector. The second optical fiber extends within the second fiber optic connector and terminates at a second fiber end. The ferrule of the first fiber optic connector includes an end face which faces the second fiber optic connector when the second fiber optic connector is mated with the first fiber optic connector. The end face of the ferrule of the first fiber optic connector consists of a single face.

In accordance with another embodiment, a fiber optic interface is provided. The fiber optic interface includes an optical loss test set and a test cable. The optical loss test set includes an optical power meter and a test port optically connected to the optical power meter. The test port includes a first fiber optic connector. The first fiber optic connector has a ferrule extending from a distal end to a proximal end along a longitudinal direction. The ferrule includes a contact interface defined at the proximal end of the ferrule. An optical fiber extends within the ferrule along the longitudinal direction and terminates at a fiber end. The fiber end is spaced apart from the contact interface towards the distal end of the ferrule along the longitudinal direction by a distance. The distance is at least five microns. The test cable includes a second fiber optic connector configured to mate with the first fiber optic connector. The second fiber optic connector includes a second optical fiber configured for optical communication with the first optical fiber when the second fiber optic connector is mated with the first fiber optic connector. The second optical fiber extends within the second fiber optic connector and terminates at a second fiber end. The ferrule of the first fiber optic connector comprises an end face which faces the second fiber optic connector when the second fiber optic connector is mated with the first fiber optic connector. The end face of the ferrule of the first fiber optic connector consists of a single face.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures.

DETAILED DESCRIPTION

Figure 1:
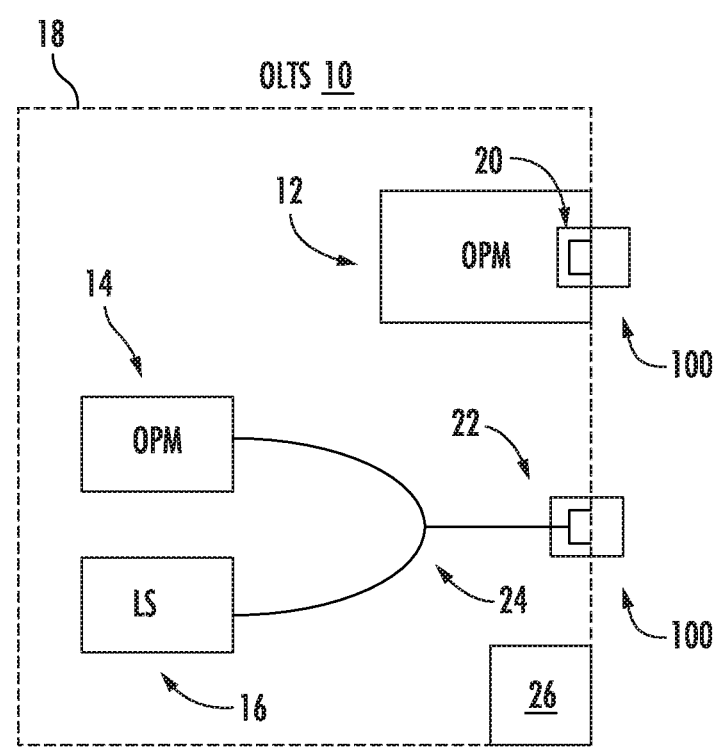
FIG. 1 is a schematic view of an optical loss test set which may incorporate one or more fiber optic connectors in accordance with one or more embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," "about," or "approximately," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, the present disclosure is generally directed to a fiber optic connector 100 which may be incorporated in various optical devices and to fiber optic interfaces including one or more such fiber optic connectors, for example, fiber optic connectors configured to form a mated connection therebetween. As discussed, there are known issues with the connection of fiber optic cables to testing equipment such as a light source or a power meter which can prevent the connection of certain types of connectors and which can introduce uncertainty into insertion loss measurements. Accordingly, improved fiber optic connectors 100 are provided in accordance with the present disclosure. Such fiber optic connectors 100 in accordance with the present disclosure advantageously reduce or eliminate variation in insertion losses. As will be described in more detail below, the fiber optic connector 100 may be part of a testing apparatus such as a light source, an optical power meter, an optical loss test set, and/or a fiber optic cable. It is to be understood that such devices are provided by way of example and without limitation, the fiber optic connector 100 may be incorporated into other optical devices as well.

For example, FIG. 1 illustrates an optical loss test set (OLTS) 10 which may incorporate a fiber optic connector 100 according to one or more embodiments of the present disclosure. The OLTS 10 measures the power in an optical signal, as is generally understood. For example, an OLTS 10 in accordance with the present disclosure may include a first optical power meter 12, a second optical power meter 14, and an internal light source 16. The optical power meters 12, 14, and internal light source 16 may be generally disposed within a body 18 of the OLTS. In various operations, one or both of the power meters 12 and 14 may be used to measure power in an optical signal, such as from one or more fiber optic cables. Such fiber optic cable(s) may be connected to the OLTS 10 and thereby in optical communication with the OLTS 10 via one or more test ports. For example, first optical power meter 12 may be accessible via a first test port 20 which is in optical communication with the first optical power meter 12. Accordingly, light may be transmitted to the first optical power meter 12 through and from the first test port 20. Similarly, second optical power meter 14 may be accessible via a second test port 22 which is in optical communication with the second optical power meter 14. Accordingly, light may be transmitted to the second optical power meter 14 through and from the second test port 22. In some embodiments of the present disclosure, one or both of the first test port 20 and the second test port 22 may be or include a fiber optic connector 100 as described herein.

Additionally, internal light source 16 may be accessible via the second test port 22, which may also be in optical communication with the internal light source 16. Accordingly, light may be transmitted from the internal light source 16 to and through the second test port 22. An optical branching device 24 (which may for example include a splitter and/or other suitable apparatus, such as optical fiber couplers, etc., for providing such branching) extending between the internal light source 16, second optical power meter 14, and second test port 22 may, for example, optically connect the second test port 22 with both the second optical power meter 14 and the internal light source 16.

OLTS 10 may further include a controller 26. The controller 26 may be in communication with other components of the OLTS 10, including the first optical power meter 12, second optical power meter 14, and internal light source 16. Controller 26 may be configured and operable to cause such other components to perform the various operations and method steps as discussed herein.

Controller 26 may generally comprise a computer or any other suitable processing unit. For example, the controller 26 may include one or more processor(s) and associated memory device(s) configured to perform a variety of computer-implemented functions, as discussed herein. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 26 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 26 to perform various computer-implemented functions including, but not limited to, performing the various steps discussed herein. In addition, the controller 26 may also include various input/output channels for receiving inputs from and for sending control signals to the various other components of the OLTS 10, including the first optical power meter 12, second optical power meter 14, and internal light source 16, as well as to components of other OLTSs 10 in a system of OLTSs.

Figure 2:
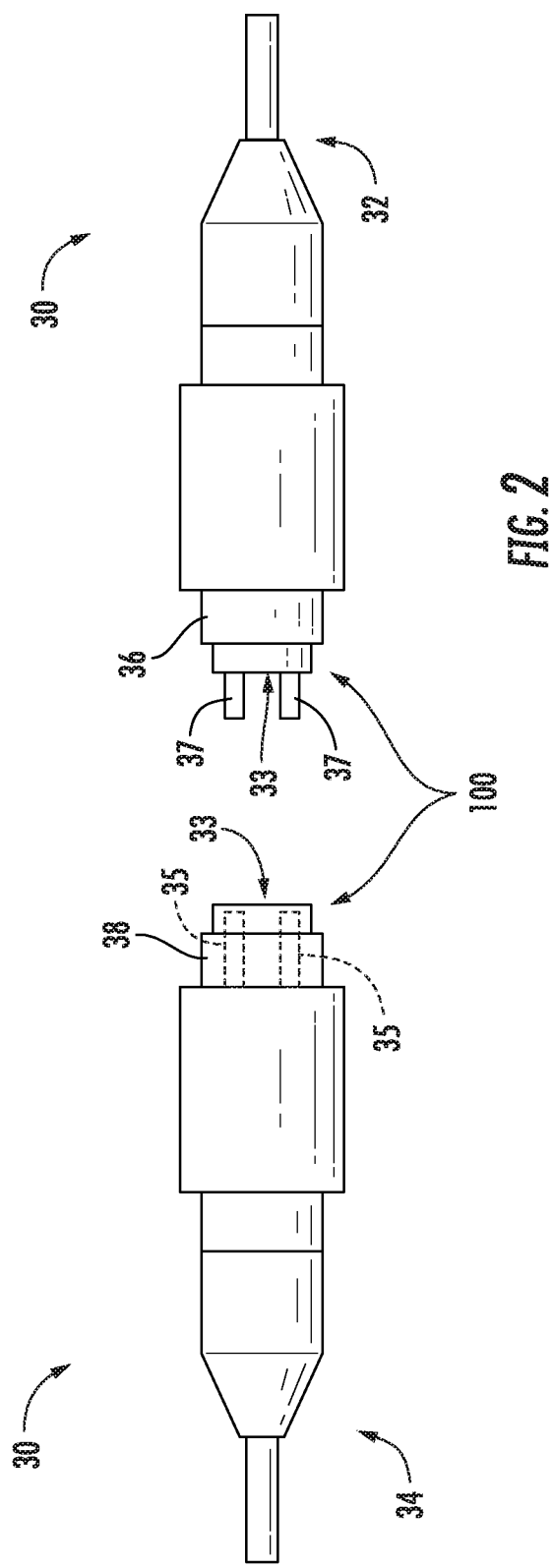
FIG. 2 is a view of connectors of a fiber optic cable, one or more of which may include fiber optic connectors in accordance with one or more embodiments of the present disclosure.

Referring now to FIG. 2, in some embodiments the fiber optic connector 100 in accordance with the present disclosure may be provided as a connector of a fiber optic cable 30, such as the multi-fiber cables illustrated in FIG. 2. Each fiber optic cable 30 may extend from a first end 32 to a second end 34 and may include a connector at each end 32 and 34, for example a male connector 36 at the first end 32 and a female connector 38 at the second end 34, as illustrated in FIG. 2. Each fiber optic cable 30 may include one or more optical fibers 40 (FIGS. 5-18) extending from the first end 32 to the second end 34. The one or more optical fibers 40 extend at least partially through each connector 36 and 38 and terminate at a fiber end 42 (FIG. 6). Such termination of the fiber end 42 may, for example, occur short of an end face 33 of the connector 36 and/or 38, as shown in FIGS. 6 and 7, or may, in other examples, occur at the end face 33, as shown in FIG. 10. The foregoing examples will be described in more detail below. As illustrated in FIG. 2, the connectors 36 and 38 may be multiple-fiber connectors, such as Multiple-Fiber Push-On ("MPO") connectors. For example, as illustrated in FIG. 2, the male connector 36 may further include one or more alignment pins 37 or other protrusions extending from the end face 33. Such alignment pins 37 or other protrusions may be accommodated by sockets 35 extending into the female connector 38 from the end face 33 of the female connector 38. As indicated in FIG. 2, in various embodiments, either or both of the male connector 36 and the female connector 38 may include the fiber optic connector 100 in accordance with the present disclosure.

Figure 3:
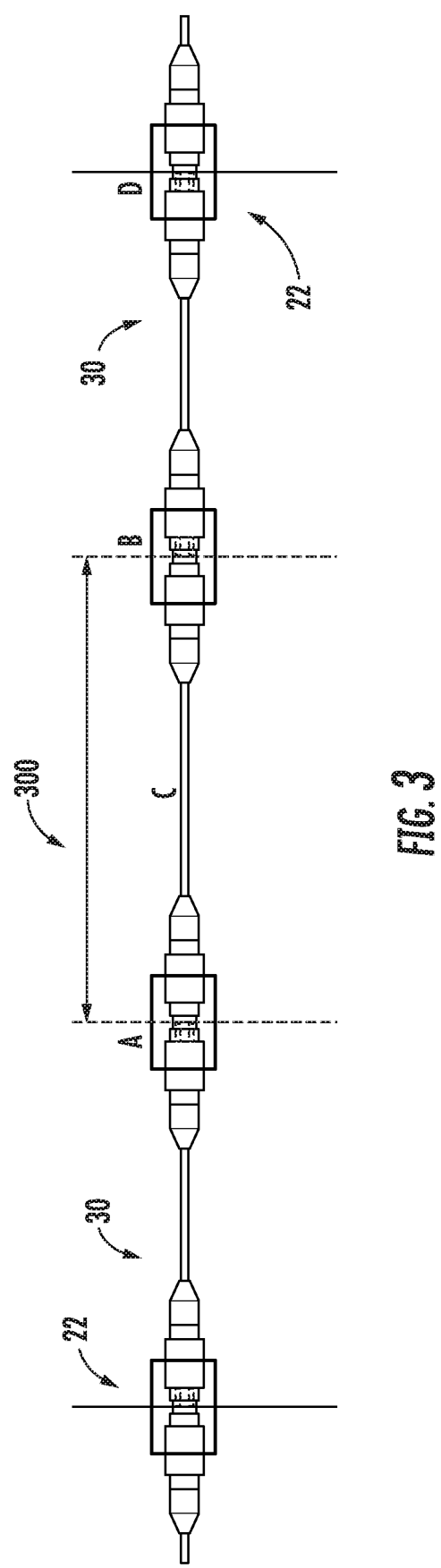
FIG. 3 is a schematic illustrating a testing configuration such as may be used in optical loss testing and which may incorporate one or more fiber optic connectors in accordance with one or more embodiments of the present disclosure.
Figure 4:
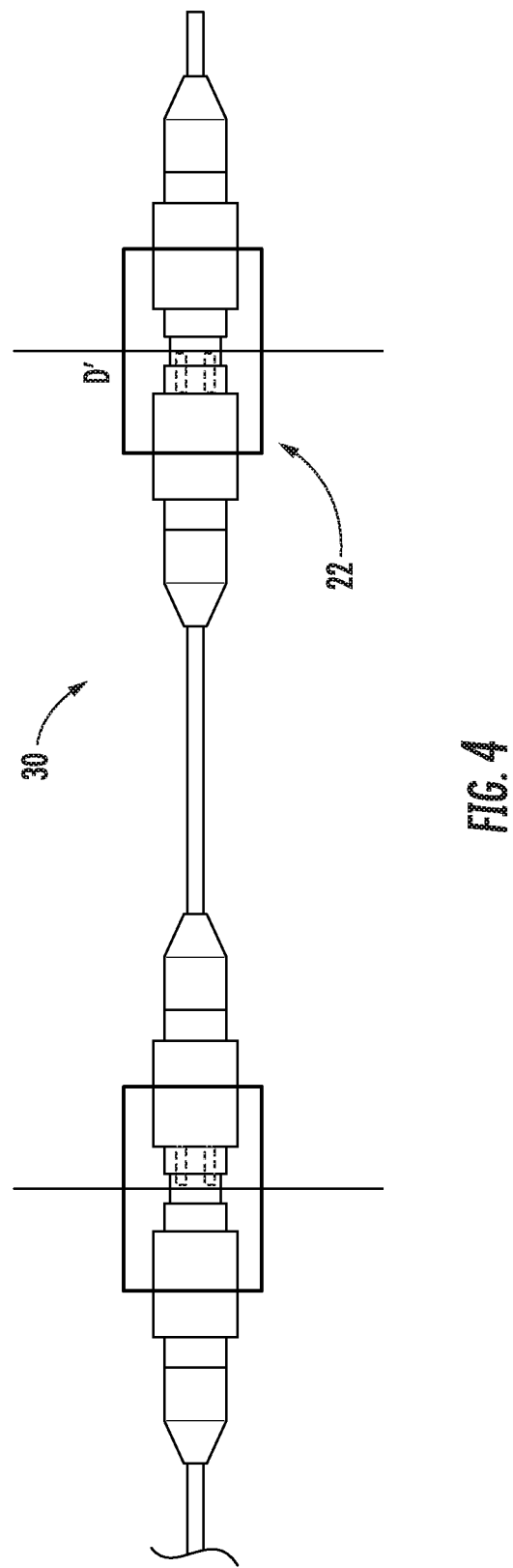
FIG. 4 is a schematic illustrating a configuration for obtaining a reference power such as may be used in optical loss testing; which configuration may include one or more fiber optic connectors in accordance with one or more embodiments of the present disclosure.

Turning now to FIGS. 3 and 4, example configurations for optical loss testing are illustrated. As shown in FIG. 3, the configuration includes a device under test ("DUT") 300, and the DUT 300 is connected between a light source and a power meter. For example, the DUT 300 may be connected between pair of OLTSs 10 (FIG. 1), e.g., at the second test port 22 of each OLTS 10, such that the light source and power meter each are components of a respective OLTS 10. Such configuration may be used for unidirectional and/or bi-directional loss testing. In other embodiments, the DUT 300 may, for example, be connected to the first test port 20 of one of the OLTSs 10 and/or one or both of the OLTSs 10 may be replaced with a standalone power meter or light source. As shown in FIG. 3, the DUT 300 may be connected to the light source and power meter, e.g., to each OLTS 10, via a test cord. For example, one or both of the test cords may be a fiber optic cable 30, as described above.

The loss may be determined based on a reference power, where the reference power may be determined using a configuration such as the example configuration illustrated in FIG. 4, where the power through one of the two test cords 30 is measured with a first test cord 30 connected between the second test port 22 of a first OLTS 10 and a corresponding second test port 22 of a second OLTS 10. The second test cord 30 will be connected to the second test port 22 of the second OLTS 10 during loss measurement. The first test cord 30 preferably remains connected to the same test port 22 of the first OLTS 10 throughout the remainder of the testing procedure once the reference power is obtained. Also, each of the test cords 30 may include a fiber optic connector 100 according to the present disclosure at one or both ends, such as at an end connected to the corresponding OLTS 10. As shown in FIG. 3, the measured insertion loss ("IL") may include fiber loss C through the DUT 300 and connection losses A and B at each end of the DUT 300. As shown in the below formula, the insertion loss IL also includes the difference between the loss D during the test (FIG. 3) and the loss D' during the reference (FIG. 4) at the second test port 22 of the second OLTS 10.

$$IL = A + C + B + D - D'$$

The loss of A+C+B is the targeted measurement. However, as can be seen, a large variation in insertion loss from the referencing configuration of FIG. 4 to the testing configuration of FIG. 3, e.g., a large value of D-D' in the above formula, introduces significant uncertainty into the insertion loss IL measurement. Accordingly, the variation in insertion loss D-D' is advantageously as close to zero as possible.

Figure 5:
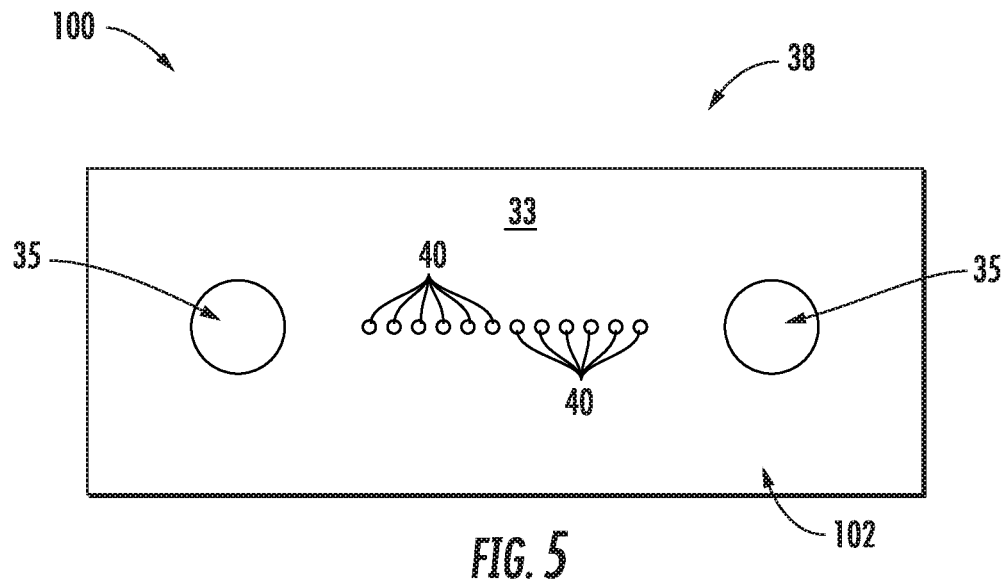
FIG. 5 is an end face view of an example fiber optic connector according to one or more embodiments of the present disclosure.
Figure 6:
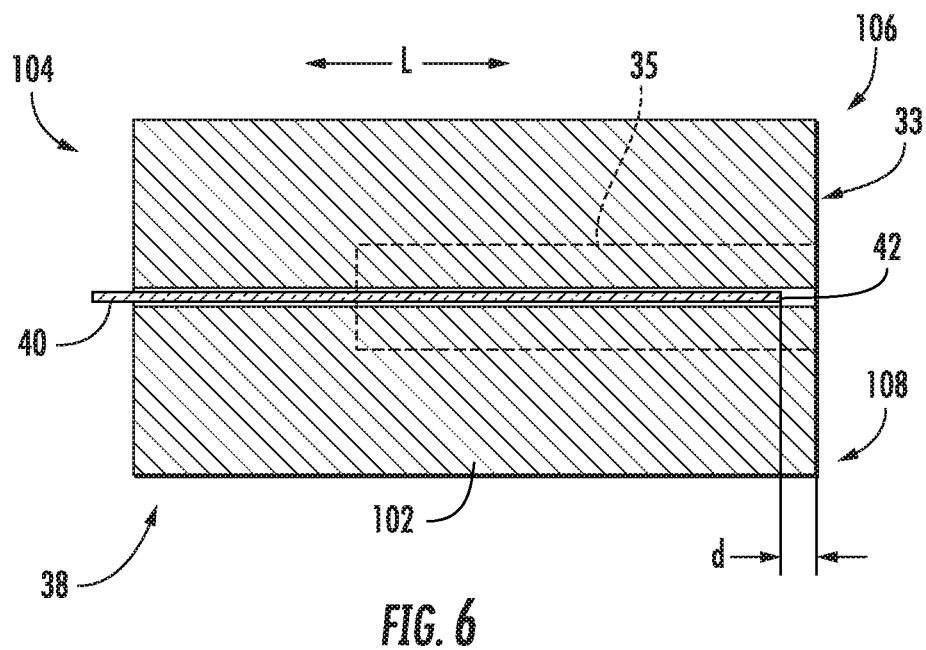
FIG. 6 is a side section view of the example fiber optic connector of FIG. 5.
Figure 7:
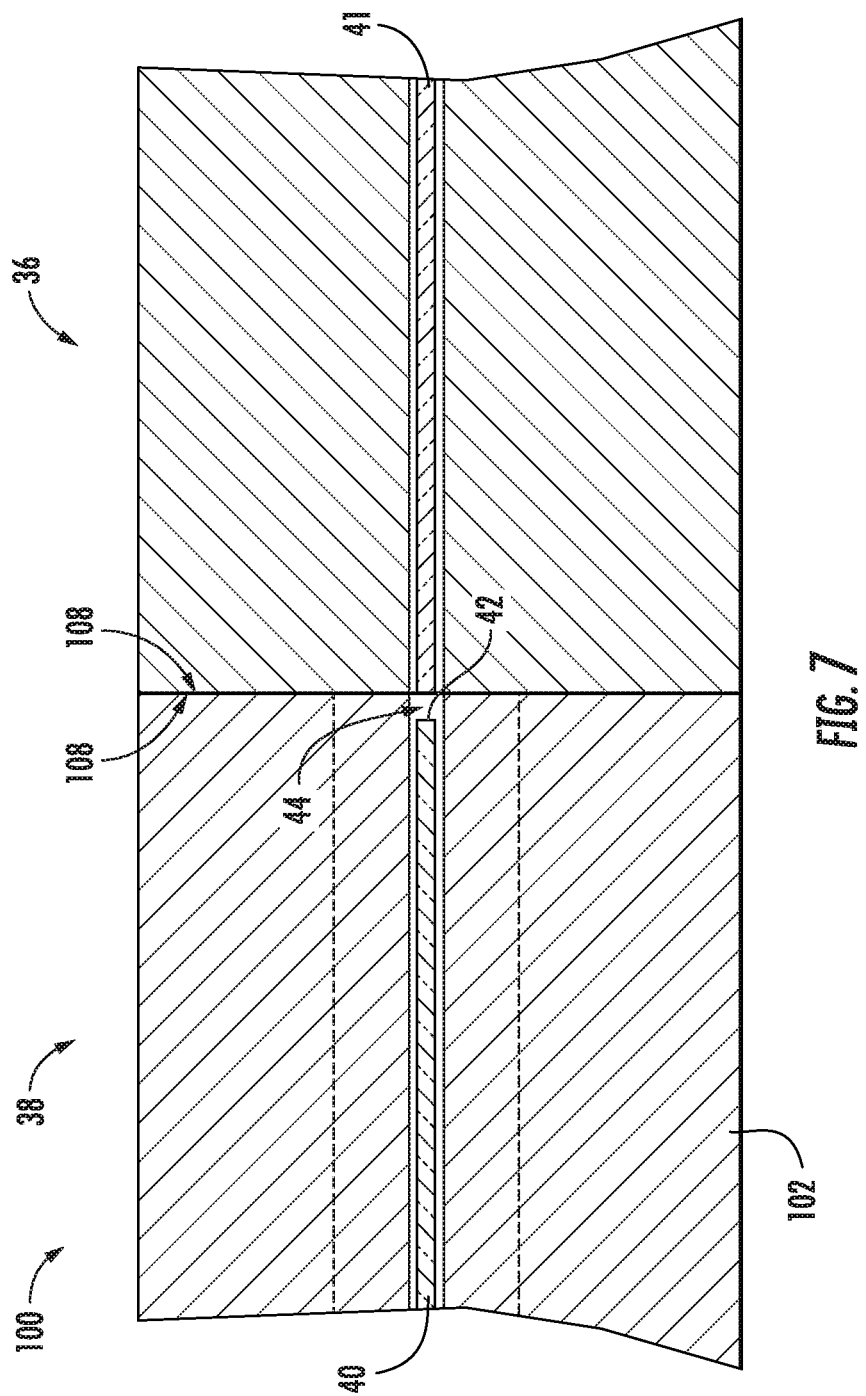
FIG. 7 is a side section view of a fiber optic interface according to one or more embodiments of the present disclosure, the fiber optic interface including the example fiber optic connector of FIG. 5 connected with a complementary connector of a second optical device.

As shown for example in FIGS. 5 and 6, an example fiber optic connector 100 according to the present disclosure may include a ferrule 102 with a plurality of optical fibers 40 arranged therein. For example, as seen in FIG. 5, the plurality of optical fibers 40 includes twelve optical fibers 40 arranged in a single row. In other embodiments, a single optical fiber 40 may be provided, or a plurality of optical fibers 40 may include more or fewer than twelve optical fibers 40, and the plurality of optical fibers 40 may be arranged in more than one row. As best seen in FIG. 6, the ferrule 102 extends from a distal end 104 to a proximal end 106 along a longitudinal direction L. In various embodiments, the fiber optic connector 100 may include a contact interface 108 which is configured to physically contact a corresponding contact interface of a second connector when the second connector, e.g. a second fiber optic connector, is mated with the fiber optic connector 100. The contact interface 108 may be one or more contact points, a line of contact or contact edge, a contact surface, or combinations thereof. In the embodiment illustrated in FIGS. 5-7, a contact surface 108 (which is an example embodiment of the contact interface 108, as mentioned) is provided. As shown, the end face 33 of the ferrule 102 defines the contact surface 108 of the connector 38 at the proximal end 106 of the ferrule 100. The contact surface 108 may be generally perpendicular to the longitudinal direction L, e.g., as illustrated in FIGS. 5 and 6. In other embodiments, the contact surface 108 may be curvilinear, e.g., convex or concave, and/or may be oblique to the longitudinal direction L. Also as may be seen in FIG. 6, at least one optical fiber 40 of the plurality of optical fibers 40 extends within the ferrule 102 along the longitudinal direction L and terminates at a fiber end 42, where the fiber end 42 is spaced apart from the end face 33 and contact surface 108 towards the distal end 104 of the ferrule 102 along the longitudinal direction L by a distance d. As shown in FIGS. 5 and 6, the example fiber optic connector 100 is illustrated as a female connector 38 including sockets 35. For example, the sockets 35 may extend from the end face 33 into the ferrule 102 towards the distal end 104 of the ferrule 102 along the longitudinal direction L. However, as mentioned above, in other embodiments, the example fiber optic connector 100 may also be a male connector 36 having one or more alignment pins 37. Further, in various embodiments, the fiber optic connector 100 may be incorporated in one or both ends of a fiber optic cable 30 and/or one or both test ports 20 and 22 of an OLTS 10. For example, any of the foregoing devices may include an optical fiber 40 therein which is spaced apart from the end face 33 and contact surface 108 towards the distal end 104 of the ferrule 102 along the longitudinal direction L by the distance d. One example method of forming the spacing or gap between the fiber end 42 and the end face 33 is over-polishing the fiber 40 and ferrule 102. Although over-polishing is considered undesirable in a standard fiber optical polish process, over-polishing may be advantageous for fiber optic connectors 100 according to the present disclosure.

FIG. 7 illustrates an exemplary fiber optic interface including a first fiber optic connector 100 and a second fiber optic connector 36. As mentioned above, the first fiber optic connector 100 includes a first optical fiber 40 and the second fiber optic connector 36 includes a second optical fiber 41. As shown in FIG. 7, the inward offset of the first fiber end 42 of the first optical fiber 40, e.g., by a distance d as described above, creates an air gap 44 between the optical fiber 40 and the mating second optical fiber 41 when the fiber optic connector 100 (which in the illustrated example embodiment is a female connector 38) is connected to a mating connector, e.g., the male connector 36 illustrated in FIG. 7, to form a fiber optic interface as illustrated in FIG. 7. Such interface may be useful for, e.g., optical testing such as the optical testing procedures described above with respect to FIGS. 3 and 4. The air gap 44 allows light 200 (FIG. 11) to exit from the fiber end 42 and expand into larger beams, and the counterpart fiber 41 can more easily align with such expanded beams. As a result of such expansion, it is recognized that the average connection loss may be increased, e.g., the magnitude of each of D and D' may be increased. However, this new light coupling mechanism can substantially reduce the above-mentioned connector loss variations. Accordingly, although such increased average connection loss is generally considered undesirable, the fiber optic connector 100 according to the present disclosure provides a substantially reduced variation, e.g., the value of D-D' is reduced to approximately zero, which may be advantageous in parallel/MPO link loss testing, such as the example testing configurations and procedures described above.

Figure 8:
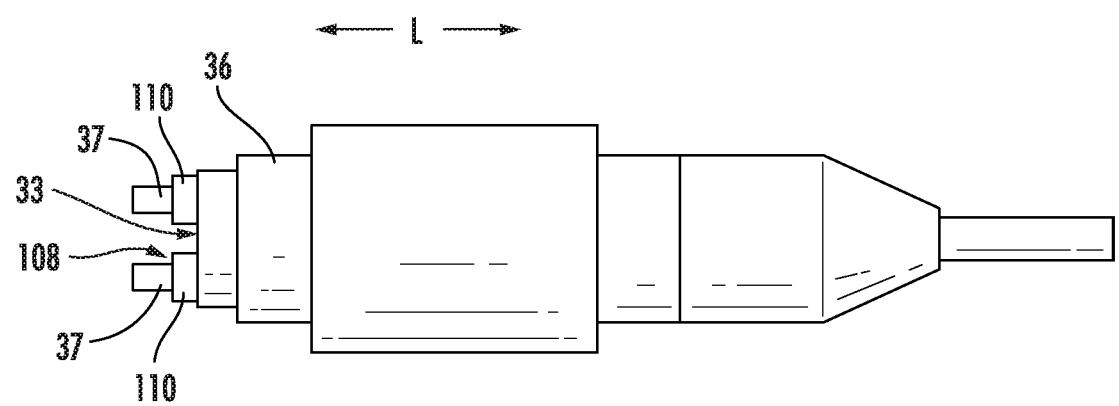
FIG. 8 is a side view of an example fiber optic connector according to one or more additional embodiments of the present disclosure.
Figure 9:
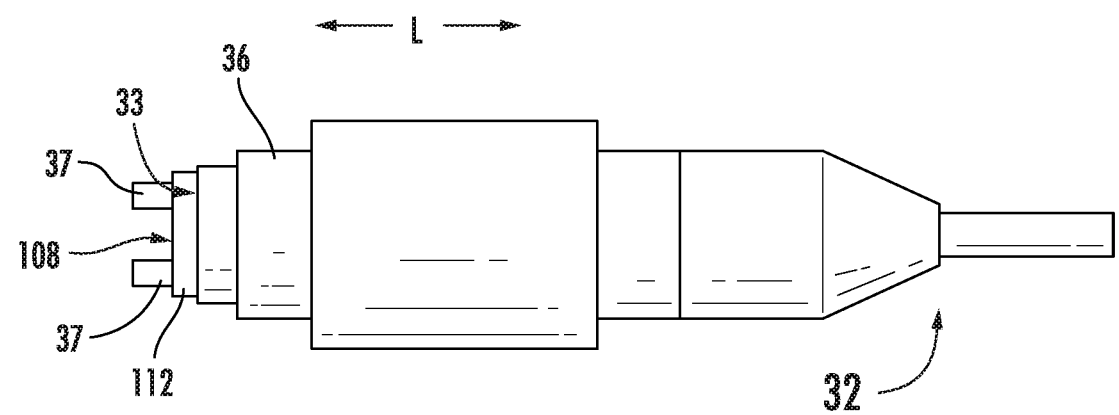
FIG. 9 is a side view of an example fiber optic connector according to one or more additional embodiments of the present disclosure.
Figure 10:
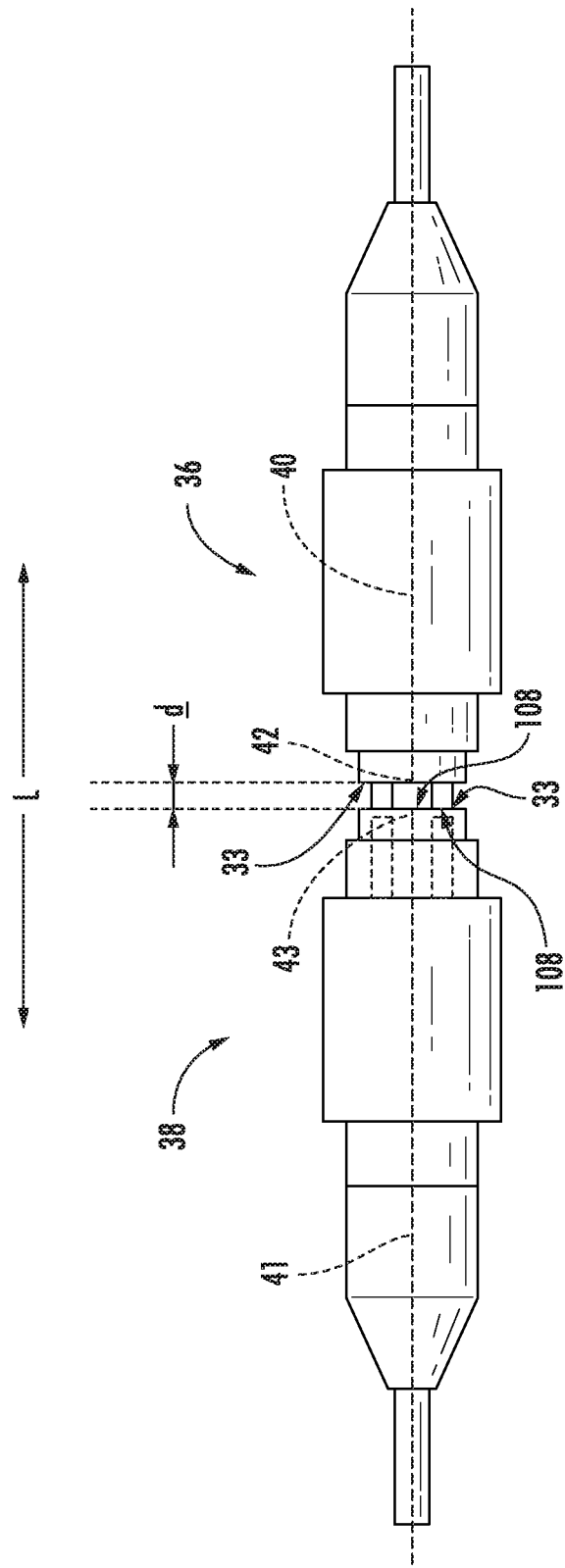
FIG. 10 is a side section view of a fiber optic interface according to one or more embodiments of the present disclosure, the fiber optic interface including the example fiber optic connector of FIG. 8 or FIG. 9 connected with a complementary connector of a second optical device.

In some embodiments, for example as shown in FIGS. 8 and 9, the contact surface 108 may be spaced apart from the end face 33, such that a gap may be introduced by separating the two connectors when the two connectors are joined, as shown in FIG. 10. In such embodiments, the fiber end 42 (e.g., FIG. 10) may be positioned at the end face 33, e.g., the fiber end 42 may be aligned with the end face 33 along the longitudinal direction L. For example, a standard polish process may be applied in such embodiments. However, the connectors 100 of FIGS. 8 and 9 may also include one or both fiber ends 42 spaced apart from the end face 33 towards the distal end 104 of the ferrule 102, e.g., via over-polishing as described above.

For example, as shown in FIG. 8, the contact surface 108 may be defined by one or more collars 110 disposed on and around the pins 37. Such embodiments may generally include a corresponding number of collars 110 as pins 37, e.g., two pins 37 with a collar 110 on each pin 37, as illustrated in FIG. 8. Thus, more than one contact surface 108 may be provided in some embodiments, such as two contact surfaces 108 in FIG. 8. As shown, the collars 110 may surround the pins 37 at a distal end of the pins 37 and the collars 110 may abut the end face 33 of the ferrule 102. Accordingly, the contact surface(s) 108 defined by the collars 110 are spaced apart from the end face 33 along the longitudinal direction L by a thickness or width of the collars 110, such that the distance d between the fiber ends 42 (as shown, e.g., in FIG. 10) is defined by the width of the collars 110 when the fiber ends 42 are aligned with the end faces 33 along the longitudinal direction L. In some embodiments, the collars 110 may include or be formed of a metal material. Additionally, any other suitable material may be used for the collars 110. Each collar 110 may define an outer diameter. The outer diameter may be chosen so as not to block light propagation between connectors 36 and 38. For example, the outer diameter of the collars 110 may be sufficiently small that the collars 110 do not extend between or otherwise obstruct the fibers 40 and 41, e.g., when the connectors 36 and 38 are connected.

Another example is illustrated in FIG. 9, where the connector 100 includes an optical coating 112 on the end face 33. For example, the optical coating 112 may be a hard optical grade plastic. In such embodiments, the optical coating 112 may define the contact surface 108, and the fiber ends 42 may be spaced apart by the distance d due to the thickness of the optical coating 112 when the connectors 36 and 38 are connected. As will be understood by those of skill in the art, the material of the optical coating 112, e.g., the hard optical grade plastic, may be selected to provide proper optical coupling characteristics.

When a connector 100 such as one of the example connectors 100 illustrated in FIGS. 8 and 9 is connected or mated with a mating connector, for example as in the fiber optic interface illustrated in FIG. 10, the end faces 33 will be spaced apart by the distance d. Note that in FIG. 10, the spacer (e.g., collar 110 of FIG. 8 or coating 112 of FIG. 9) is not shown in order to more clearly show the space defined by the spacer, e.g., the distance d between the end face 33 of the male connector 36 and the end face 33 of the female connector 38. As indicated in FIG. 10, the fiber optic connector 100 of the present disclosure is the male connector 36, e.g., the end face 33 of the female connector 38 defines the contact surface 108 of the female connector 38 whereas the contact surface 108 of the male connector 36 is spaced apart from the end face 33 of the male connector 36, e.g., where the contact surface 108 of the male connector 36 is defined by the collar 110 of FIG. 8 or the coating 112 of FIG. 9. Accordingly, where each fiber end 42 and 43 of each connector 36 and 38 is aligned with each respective end face 33 along the longitudinal direction L as in FIG. 10, the first fiber end 42 of the first optical fiber 40 in the male connector 36 is spaced apart from the contact surface 108 towards the distal end 104 (FIG. 6) of the ferrule 102 along the longitudinal direction L by the distance d as a result of the collar 110 or coating 112. Additionally, it should be appreciated that the fiber optic connector 100 of the present disclosure could also be provided as the female connector 38. For example, the collars 110 could be provided on the end face 33 of the female connector 38 and around, e.g., surrounding without obstructing, each socket 35. As another example, the optical coating 112 could be applied to the end face 33 of the female connector 38.

In various embodiments, the distance d may vary from about five microns to hundreds of microns. For example, in some embodiments, the distance d may be at least about five microns (5 µm), such as at least about ten microns (10 µm), such as at least about twelve and a half microns (12.5 µm), such as at least about fifteen microns (15 µm), such as at least about twenty microns (20 µm). As another example, in some embodiments, the distance d may be at least about twenty-five microns (25 µm). Also by way of example, the distance d may be between about five microns (5 µm) and about nine hundred ninety nine microns (999 µm), such as between about ten microns (10 µm) and about nine hundred microns (900 µm), such as between about fifteen microns (15 µm) and about eight hundred fifty microns (850 µm), such as between about twenty-five microns (25 µm) and about eight hundred microns (800 µm), such as between about fifty microns (50 µm) and about seven hundred fifty microns (750 µm). In other examples, the distance d may be as large as one millimeter (1 mm) or more.

The distance d can also vary between fibers, and between connectors. For example, the plurality of optical fibers 40 may include a first optical fiber 40 comprising a first fiber end 42 spaced apart from the contact surface 108 by a first distance, and the plurality of optical fibers 40 may also include a third optical fiber 40 extending within the ferrule 102 along the longitudinal direction L and terminating at a third fiber end 42. The third fiber end 42 may be spaced apart from the contact surface 108 towards the distal end 104 of the ferrule 102 along the longitudinal direction L by a second distance. The second distance may be any distance within the ranges for distance d set forth above. For example, the second distance may be at least five microns (5 µm). In at least some embodiments, the second distance may not be equal to the first distance, although both distances are generally within the above-mentioned ranges. For example, the first distance may be greater than about twenty-five microns (25 µm) and the second distance may be between about ten microns (10 µm) and about twenty-five microns (25 µm).

Figure 11:
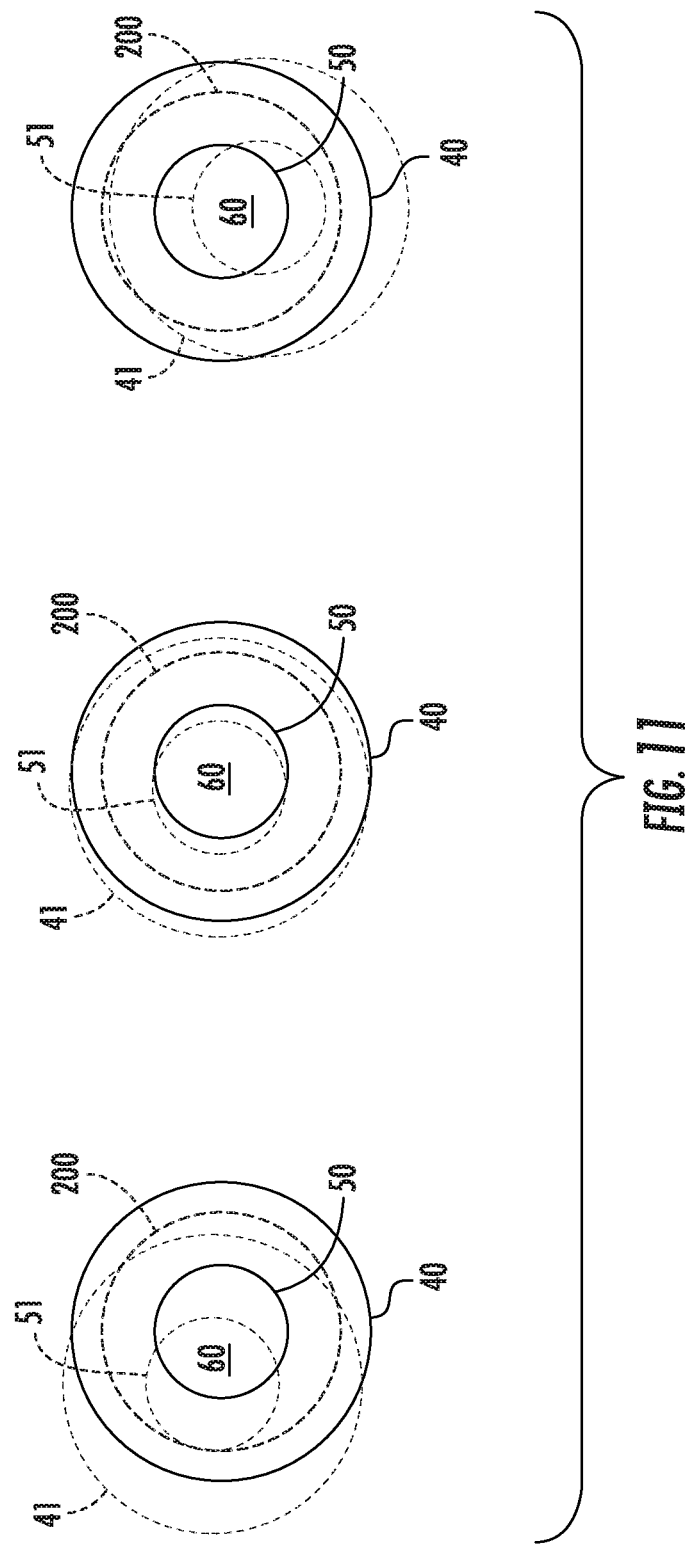
FIG. 11 is a schematic view of example optical fibers of the connected devices of FIG. 7 or FIG. 10, and light signals transmitted through the connection.

Optical coupling between the optical fibers 40 and 41 is not facilitated by a core 50 to core 51 physical contact, but from an expanded beam 200 from the core 50 to the core 51 coupling, as illustrated in FIG. 11. In other embodiments, the expanded beam 200 may emanate from the core 51 to the core 50. For example, FIG. 11 illustrates a plurality of optical fibers 40, e.g., three optical fibers 40, in various alignments with a plurality of mating optical fibers 41, e.g., three mating optical fibers 41. As illustrated, the optical fiber 40 of the fiber optic connector 100 includes light transmissive core 50 and the mating fiber 41 similarly includes light transmissive core 51. The degree of alignment between the cores 50 and 51 may vary from one fiber to the next in a multi-fiber connection and from one connection to another, e.g., from one make-up of the connection to a subsequent reconnection after disconnecting. In previous connectors, such as connectors which rely on physical contact between cores or close proximity of cores, e.g., where a distance d, if any, is minimized, e.g., is less than five microns (5 µm), light is transmitted from optical fiber 40 to optical fiber 41 only in a zone of overlap 60 between the two cores 50 and 51. As may be seen in FIG. 11, the area of the zone of overlap 60 can vary significantly. However, as can also be seen in FIG. 11, where the light from the optical fiber 40 forms an expanded beam 200, as in fiber optic connectors 100 according to the present disclosure which include the offset distance d, the core 51 of the mating optical fiber 41 is generally fully encompassed within the expanded beam 200, regardless of the variations in the overall alignment of the fibers 40 and 41. Accordingly, although the total magnitude of loss through the fiber optic connector 100 is increased relative to previous connectors with no gap or a small gap, the proportion of the expanded beam 200 which is received by the mating fiber 41 is generally the same, even as the alignment varies, such that the variation in insertion loss, e.g., the value of D-D', is reduced to approximately zero.

Figure 12:
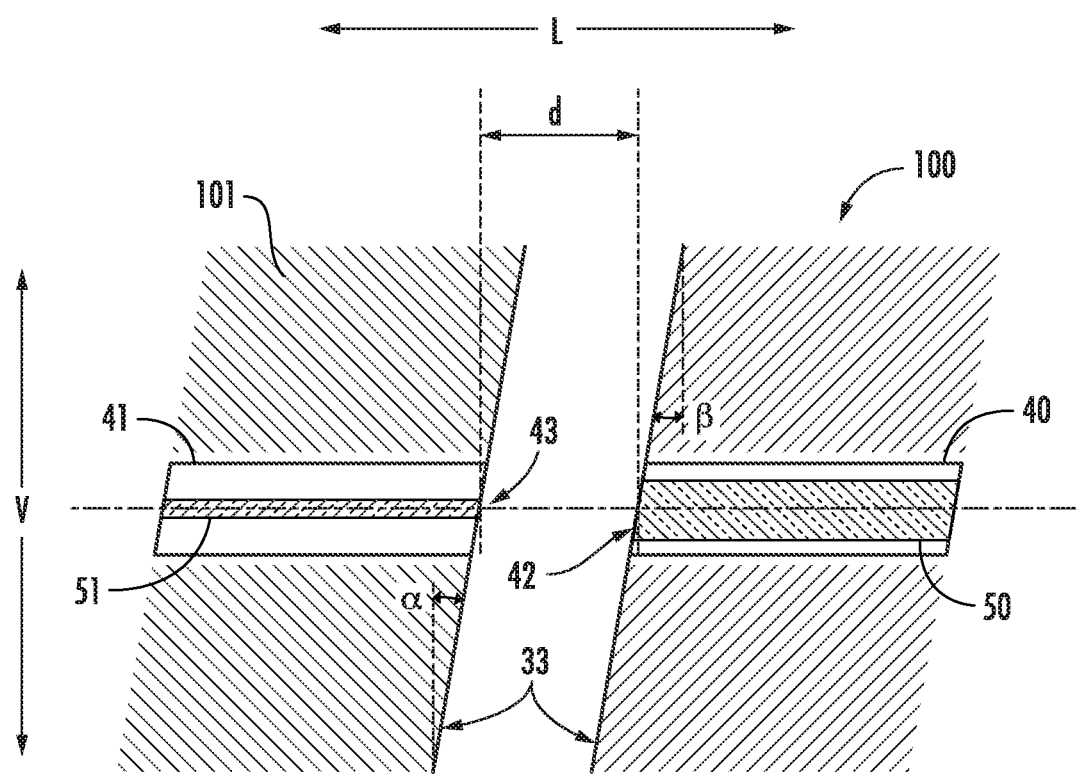
FIG. 12 is a side section view of a fiber optic interface according to one or more additional embodiments of the present disclosure.
Figure 13:
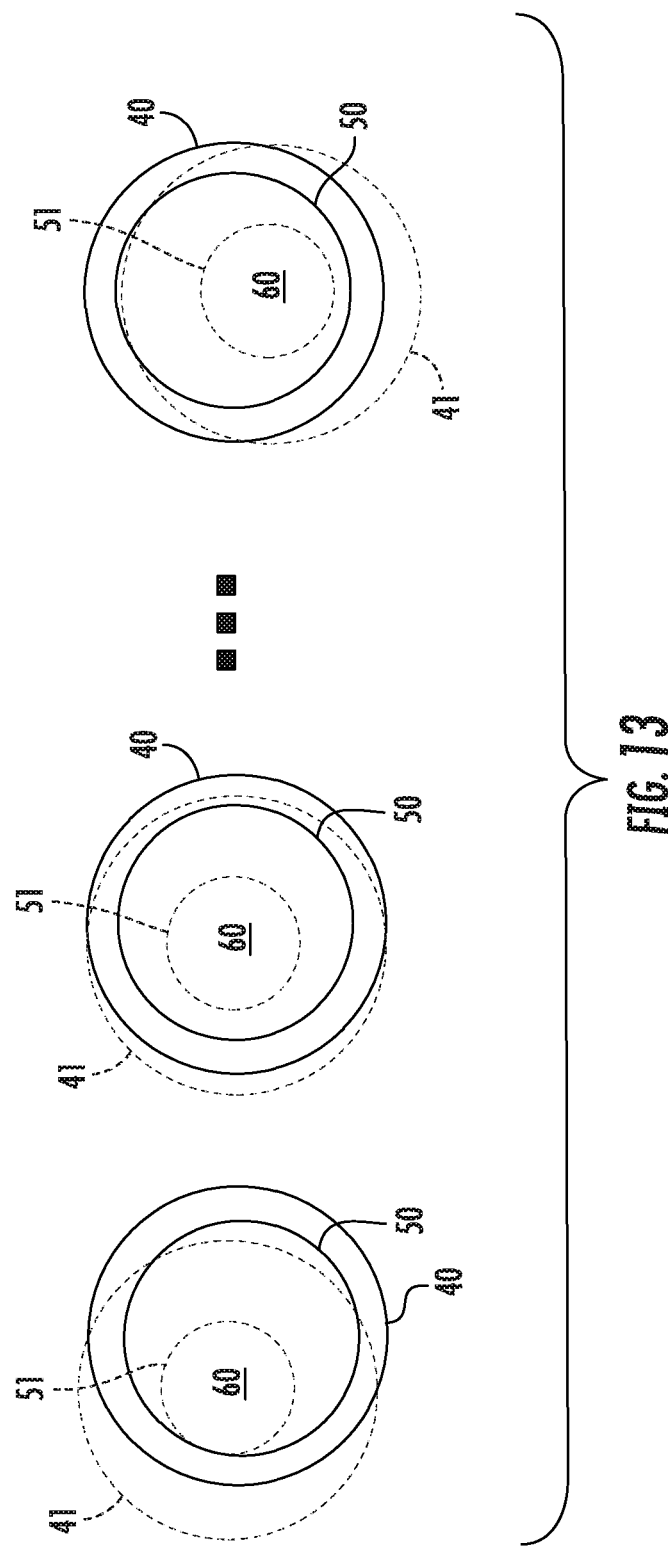
FIG. 13 is a schematic view of example optical fibers of the fiber optic interface of FIG. 12, and light signals transmitted through the connection.

An enlarged, partial view of another example fiber optic interface according to some embodiments is illustrated in FIG. 12. As noted in FIG. 12, a vertical direction V may be defined, e.g., perpendicular to the longitudinal direction L. As shown in FIG. 12, the interface includes a first fiber optic connector 100 and a second fiber optic connector 101. For example, the first fiber optic connector 100 may be a male connector 36 and the second fiber optic connector 101 may be a female connector 38, or vice versa. As mentioned, only a portion of each connector 100 and 101 is shown in FIG. 12 in order to more clearly show the interface. For example, the alignment pin 37 is not depicted in FIG. 12. As shown in FIG. 12, the end faces 33 of the connectors 100 and 101 are spaced apart by a distance d, which may be provide by a spacer such as the collar 110 of FIG. 8 or the coating 112 of FIG. 9. Also as shown in FIG. 12, the first fiber optic connector 100 may include a first optical fiber 40 having a first light-transmitting core 50 and the second fiber optic connector 101 may include a second optical fiber 41 having a second light-transmitting core 51. The first optical fiber 40 may terminate at a first fiber end 42 and the second optical fiber 41 may terminate at a second fiber end 43. The first fiber end 42 may be parallel to the second fiber end 43. In some embodiments, the first and second fiber ends 42 and 43 may be perpendicular to the longitudinal direction L, e.g., the first and second fiber ends 42 and 43 may be oriented along the vertical direction V, as shown in FIG. 7. In other embodiments, as illustrated in FIG. 12, the first and second fiber ends 42 and 43 may be oblique to the longitudinal direction L and the vertical direction V. For example, the first fiber end 42 may form an angle $\beta$ with the vertical direction V and the second fiber end 43 may form an angle $\alpha$ with the vertical direction V, as indicated in FIG. 12. In some example embodiments, the first fiber end 42 may be parallel to the second fiber end 43, e.g., the angles $\alpha$ and $\beta$ may be approximately equal.

In some embodiments, for example as illustrated in FIG. 12, a core size of the second optical fiber is less than a core size of the first optical fiber, e.g., the first core 50 may be larger than the second core 51. As may be seen in FIG. 13, in such embodiments, the area of overlap 60 between the cores 50 and 51 will consistently be about the same as the area of the second core 51, regardless of the variations in the overall alignment of the fibers 40 and 41. Accordingly, although the total magnitude of loss from the fiber 40 to the fiber 41 is increased relative to previous interfaces with matching core sizes, the total magnitude of loss from the fiber 41 to the fiber 40 is generally the same, even as the alignment varies, such that the variation in insertion loss, e.g., the value of D-D', is reduced to approximately zero.

Figure 14:
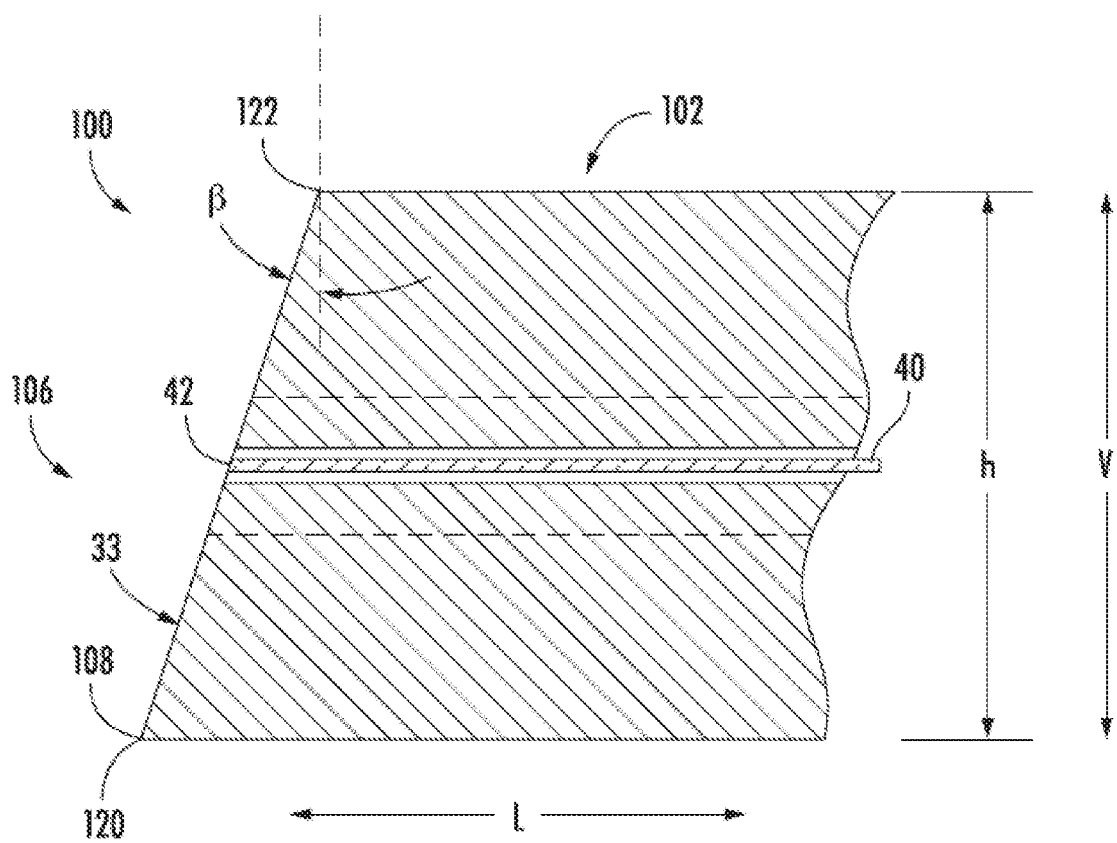
FIG. 14 is a side section view of an example fiber optic connector of an optical loss test set according to one or more embodiments of the present disclosure.

As mentioned above, e.g., in the context of FIG. 1, the fiber optic connector 100 may be a connector of an OLTS 10. FIG. 14 provides a section view of an example fiber optic connector 100 according to one such embodiment, e.g., where the fiber optic connector 100 is a connector of the OLTS 10. As indicated in FIG. 14, the fiber optic connector 100 includes a ferrule 102 which extends along the longitudinal direction L, e.g., to or toward a proximal end 106 of the ferrule 102.

The proximal end 106 of the ferrule 102 may be configured for mating with a second fiber optic connector, e.g., a fiber optic connector 500 (FIGS. 15-18) of an optical device such as a test cable. Such configuration may include, for example, a contact edge 108 for mating with the second fiber optic connector. As illustrated in FIG. 14, the ferrule 102 may include an end face 33 bounded by a first peripheral edge 120 and a second peripheral edge 122. As mentioned above, the contact interface 108 may be a contact edge. For example, in the embodiment illustrated in FIGS. 14 through 18, the contact edge 108 may be one of the peripheral edges of the end face 33 of the ferrule 102, e.g., the first peripheral edge 120, which may also be referred to as a bottom peripheral edge.

As shown in FIG. 14, the ferrule 102 may define a height h along the vertical direction V. The height h may be any suitable value, such as between about one millimeter (1 mm) and five millimeters (5 mm), such as between about one and a half millimeters (1.5 mm) and four millimeters (4 mm), such as about two and a half millimeters (2.5 mm). In other embodiments, any other suitable height h of the ferrule 402 may be provided, as those of skill in the art will recognize.

Still referring to FIG. 14, the end face 33 of the ferrule 102 may be oblique to the vertical direction V. For example, the end face 33 may form an angle β with the vertical direction V. Thus, the fiber end(s) 42 may be spaced apart from the contact edge 108 along the longitudinal direction L due to the angle β of the end face 33.

FIGS. 15 through 18 provide side section views of various fiber optic interfaces according to example embodiments of the present disclosure. Note that in FIGS. 15 through 18, the alignment pin 37 is not shown, in order to more clearly show the interface. In the embodiments illustrated by FIGS. 15-18, the first fiber optic connector is the fiber optic connector 100 of the OLTS 10 (e.g., as described above with reference to FIGS. 1 and 14) and the second fiber optic connector is the fiber optic connector 500 of the test cable. Such connectors 100 and 500 may be mated to form a fiber optic interface according to various embodiments of the present disclosure, for example, the fiber optic interfaces illustrated in FIGS. 15 through 18. When mated, the connectors 100 and 500 are connected together such that at least portions thereof (such as the contact interface 108, e.g., contact edge 108) are in physical contact and the respective optical fibers 40 and 540 are in optical communication. Additionally, note that while a small space is shown at the contact edge 108 in FIG. 18, it should be understood this is for clarity of illustration only, e.g., in order to more clearly note the angle α, and that in a fully mated condition the ferrule 502 will contact the ferrule 102 in the example embodiment illustrated by FIG. 18.

Figure 15:
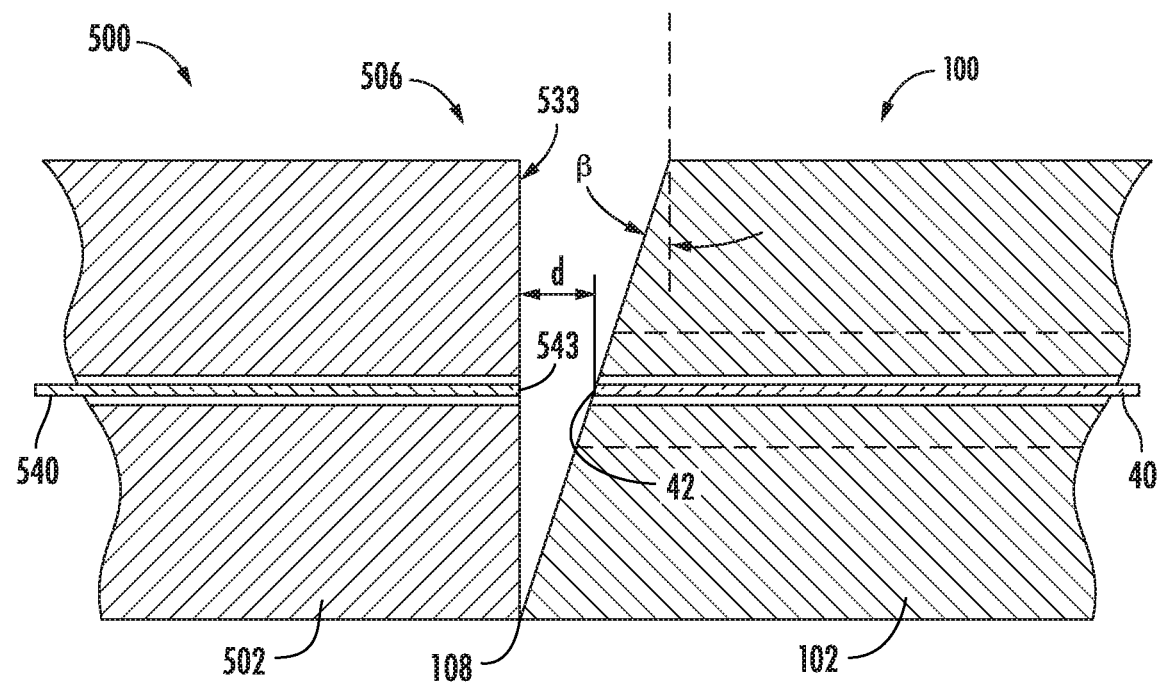
FIG. 15 is a side section view of a fiber optic interface according to one or more embodiments of the present disclosure.
Figure 16:
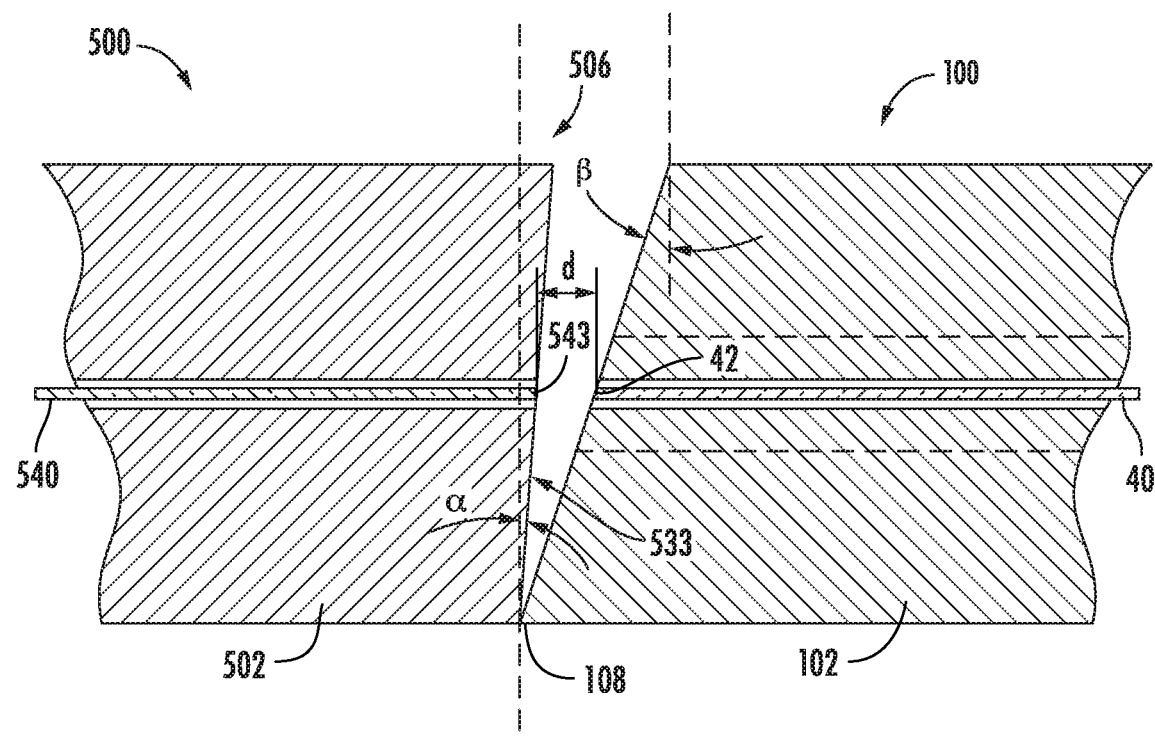
FIG. 16 is a side section view of a fiber optic interface according to one or more embodiments of the present disclosure.
Figure 17:
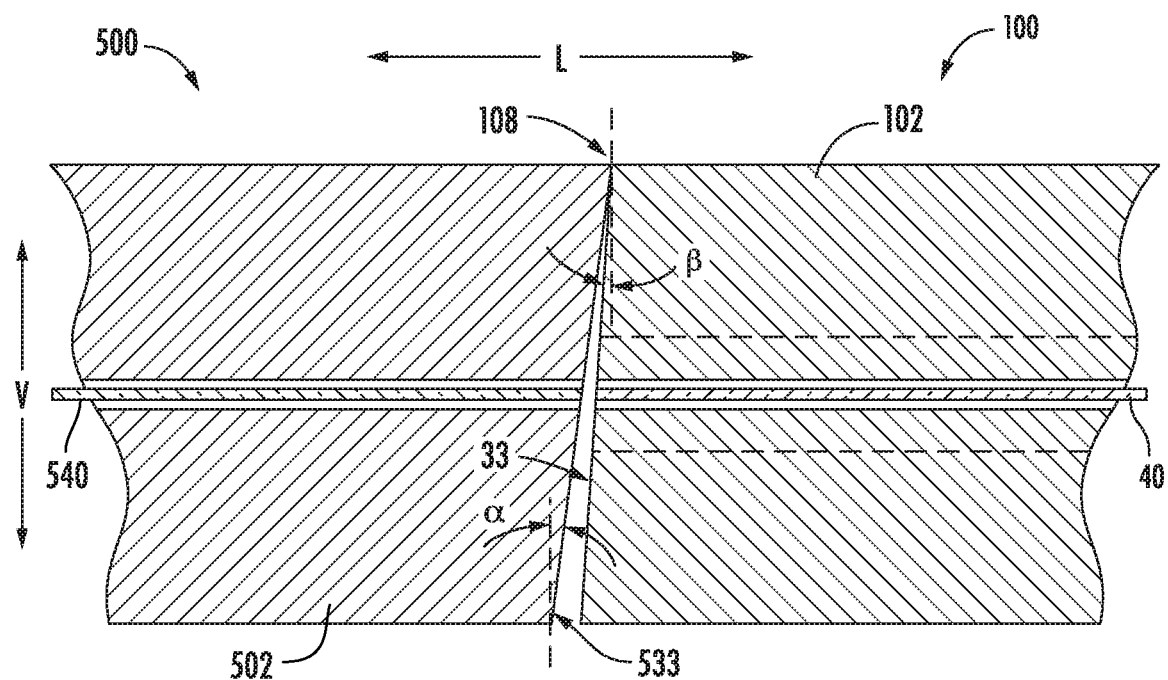
FIG. 17 is a side section view of a fiber optic interface according to one or more embodiments of the present disclosure.

The optical fiber connector 500 of the test cable may include a ferrule 502 with one or more optical fibers 540 extending through the ferrule 502 along the longitudinal direction L. The optical fiber 540 of connector 500 may terminate at a second fiber end 543. The second fiber end 543 may be positioned at or proximate to an end face 533 at a proximal end 506 of the ferrule 502. The end face 533 (and also the second fiber end 543 which is flush with the end face 533) may form an angle α with the vertical direction V, as indicated for example in FIG. 16. In FIG. 15, the angle α is zero, e.g., the end face 533 is oriented along the vertical direction V.

As may be seen in FIGS. 15 through 18, when the connector 500 of the test cable is mated with the fiber optic connector 100 of the OLTS 10 (FIG. 1), the resultant interface may include physical contact along an edge line of the ferrules 102 and 502, e.g., along peripheral edges of the ferrules 102 and 502, as described above. In such embodiments, the gap distance d between the fiber ends 42 and 543 may be defined by the space between the ferrules 102 and 502 resulting from the angles of the respective end faces 33 and 533 away from the contact edge 108. In embodiments such as those illustrated in FIGS. 15-17, the distance of the gap d may be determined based on the height h of the ferrule 102 and the angles α and β, e.g., according to the following equation:

$$d = h/2 \times |\tan \beta - \tan \alpha|.$$

Figure 18:
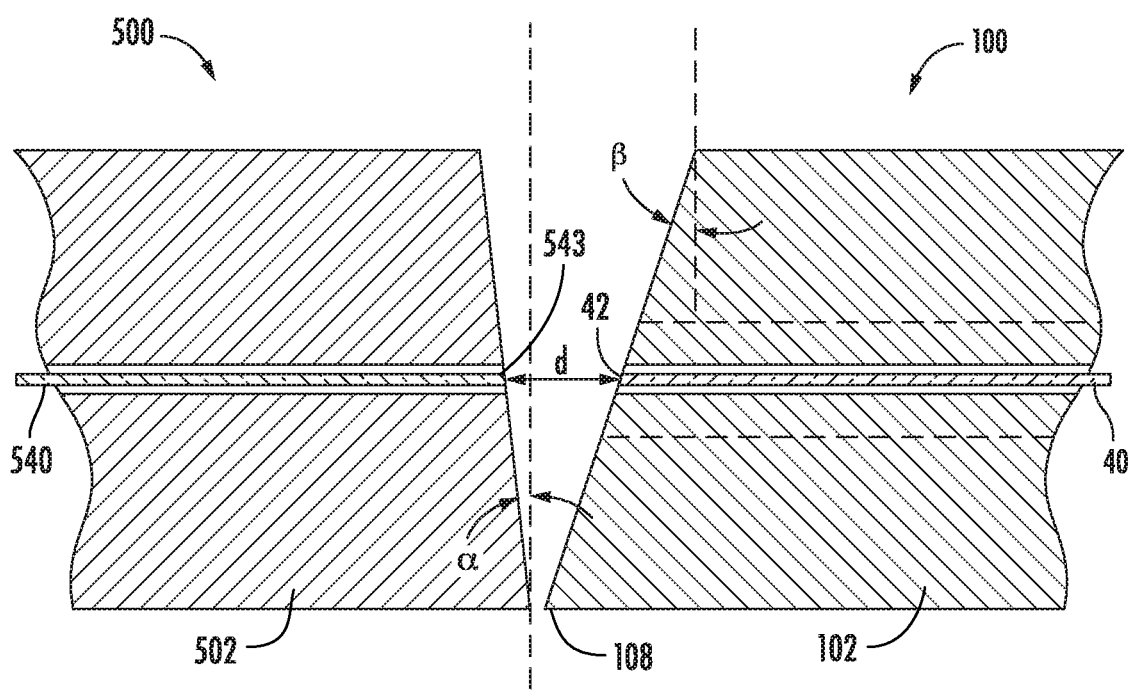
FIG. 18 is a side section view of a fiber optic interface according to one or more embodiments of the present disclosure.

In embodiments such as the example embodiment illustrated in FIG. 18, the distance of the gap d may be determined slightly differently, according to the following equation:

$$d = h/2 \times |\tan \beta + \tan \alpha|.$$

In some embodiments, the angle α may be about zero degrees (0°), e.g., connector 500 may be a flat connector, or may be about eight degrees (8°), e.g., connector 500 may be an angled connector. Any other suitable angle for the angle α may also be provided in various embodiments of the present disclosure. The angle β may be between about thirty degrees (30°) and about zero degrees (0°), such as between about zero degrees (0°) and about fifteen degrees (15°), such as between about two degrees (2°) and about twelve degrees (12°).

As may be seen throughout the FIGS, the end face 33 consists of a single face, e.g., defines a single line in each of the various side section views, such as FIGS. 6, 12, and 14, rather than a faceted or multi-planar end. The single face or single surface of the end face 33 may be planar, e.g., straight or flat, or may be curved. As such, the single line (when viewed from the side) or surface of the end face 33 may be straight (as illustrated) or curved. Accordingly, as may be seen in FIGS. 15 through 18, the contact interface, e.g., contact edge 108, is the same regardless of whether the fiber optic connector 100 of the OLTS 10 (FIG. 1) is mated with a flat connector 500 (e.g., FIG. 15) or an angled connector 500 (e.g., FIG. 16). Thus, as seen in each of FIGS. 15 through 18, physical contact between the fiber optic connector 100 of the OLTS 10 and the fiber optic connector 500 of the test cable occurs at the contact edge 108 regardless of the configuration, e.g., flat or angled, of the ferrule 502 of the test cable. Direct physical contact occurs whenever the first optical fiber connector 100 is mated with the second optical fiber connector 500, and occurs at the same location, e.g., along contact edge 108, at each mating.

As mentioned above, features illustrated or described as part of one embodiment can be used with another embodiment to yield a still further embodiment. For example, one or both of the connectors 100 and 500 illustrated in FIGS. 15 through 18 may be MPO connectors, such as the MPO connectors including pins 37 and sockets 35, as in the examples illustrated by FIGS. 5, 6, and 8 through 10. Also by way of example, one or both of connectors 100 and 500 may include spacers 110 or coating 112 as illustrated in FIGS. 8 and 9. As another example, the air gap 44 shown in FIGS. 6 and 7 may be provided in any other of the example fiber optic connector embodiments provided herein, e.g., in one or both of the connectors 100 and 500 of FIGS. 15 through 18. Numerous other combinations and variations are also possible within the scope of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fiber optic interface for optical testing, comprising:
   a first fiber optic connector, comprising:
   a ferrule extending from a distal end to a proximal end along a longitudinal direction, the ferrule comprising a contact interface defined at the proximal end of the ferrule; and
   a first optical fiber extending within the ferrule along the longitudinal direction and terminating at a first fiber end, the first fiber end spaced apart from the contact interface towards the distal end of the ferrule along the longitudinal direction by a distance, wherein the distance is at least twenty microns; and
   a second fiber optic connector configured to mate with the first fiber optic connector, the second fiber optic connector comprising a second optical fiber configured for optical communication with the first optical fiber when the second fiber optic connector is mated with the first fiber optic connector, the second optical fiber extending within the second fiber optic connector and terminating at a second fiber end;
   wherein the ferrule of the first fiber optic connector comprises an end face which faces the second fiber optic connector when the second fiber optic connector is mated with the first fiber optic connector and wherein the end face of the ferrule of the first fiber optic connector consists of a single face, and
   wherein the first optical fiber and the second optical fiber are aligned along a vertical direction perpendicular to the longitudinal direction.

2. The fiber optic interface of claim 1, wherein the contact interface is a contact surface defined on the end face of the ferrule.

3. The fiber optic interface of claim 1, wherein the contact interface is a surface defined by a coating on the end face of the ferrule.

4. The fiber optic interface of claim 3, wherein the first fiber end is aligned with the end face of the ferrule of the first fiber optic connector along the longitudinal direction, and the distance is defined by a thickness of the coating.

5. The fiber optic interface of claim 1, wherein a core size of the second optical fiber is less than a core size of the first optical fiber.

6. The fiber optic interface of claim 1, wherein the first fiber optic connector further comprises a collar, wherein the contact interface is a surface defined by the collar.

7. The fiber optic interface of claim 6, wherein the first fiber end is aligned with the end face of the ferrule along the longitudinal direction, and the distance is defined by a width of the collar.

8. The fiber optic interface of claim 1, wherein the contact interface is a contact edge defined along a peripheral edge of the end face of the ferrule of the first fiber optic connector.

9. The fiber optic interface of claim 8, wherein the end face of the ferrule of the first fiber optic connector is oblique to the longitudinal direction.

10. A fiber optic interface, comprising:
    an optical loss test set and a test cable, the optical loss test set comprising:
    an optical power meter; and
    a test port optically connected to the optical power meter, the test port comprising a first fiber optic connector, the first fiber optic connector comprising:
    a ferrule extending from a distal end to a proximal end along a longitudinal direction, the ferrule comprising a contact interface defined at the proximal end of the ferrule;
    a first optical fiber extending within the ferrule along the longitudinal direction and terminating at a first fiber end, the first fiber end spaced apart from the contact interface towards the distal end of the ferrule along the longitudinal direction by a first distance, wherein the first distance is at least five microns; and
    a third optical fiber extending within the ferrule along the longitudinal direction and terminating at a third fiber end, the third fiber end spaced apart from the contact surface towards the distal end of the ferrule along the longitudinal direction by a second distance, wherein the second distance is at least five microns and is not equal to the first distance;
    wherein the test cable comprises a second fiber optic connector configured to mate with the first fiber optic connector, the second fiber optic connector comprising a second optical fiber configured for optical communication with the first optical fiber when the second fiber optic connector is mated with the first fiber optic connector, the second optical fiber extending within the second fiber optic connector and terminating at a second fiber end;
    wherein the ferrule of the first fiber optic connector comprises an end face which faces the second fiber optic connector when the second fiber optic connector is mated with the first fiber optic connector and wherein the end face of the ferrule of the first fiber optic connector consists of a single face.

11. The fiber optic interface of claim 10, wherein the contact interface is a contact edge defined along a peripheral edge of the end face of the ferrule of the first fiber optic connector.

12. The fiber optic interface of claim 11, wherein the end face of the ferrule of the first fiber optic connector is oblique to the longitudinal direction.

13. The fiber optic interface of claim 10, wherein a core size of the second optical fiber is less than a core size of the first optical fiber.

14. The fiber optic interface of claim 10, wherein the first fiber optic connector further comprises an alignment pin extending from the end face along the longitudinal direction away from the ferrule.

15. The fiber optic interface of claim 10, wherein the first fiber optic connector further comprises a socket extending from the end face into the ferrule towards the distal end of the ferrule along the longitudinal direction.

16. A fiber optic interface, comprising:
an optical loss test set and a test cable, the optical loss test set comprising:
an optical power meter; and
a test port optically connected to the optical power meter, the test port comprising a first fiber optic connector, the first fiber optic connector comprising:
a ferrule extending from a distal end to a proximal end along a longitudinal direction, the ferrule comprising a contact interface defined at the proximal end of the ferrule;
a first optical fiber extending within the ferrule along the longitudinal direction and terminating at a first fiber end, the first fiber end spaced apart from the contact interface towards the distal end of the ferrule along the longitudinal direction by a distance, wherein the distance is at least twenty microns;
wherein the test cable comprises a second fiber optic connector configured to mate with the first fiber optic connector, the second fiber optic connector comprising a second optical fiber configured for optical communication with the first optical fiber when the second fiber optic connector is mated with the first fiber optic connector, the second optical fiber extending within the second fiber optic connector and terminating at a second fiber end;
wherein the ferrule of the first fiber optic connector comprises an end face which faces the second fiber optic connector when the second fiber optic connector is mated with the first fiber optic connector and wherein the end face of the ferrule of the first fiber optic connector consists of a single face, and
wherein the first optical fiber and the second optical fiber are aligned along a vertical direction perpendicular to the longitudinal direction.

17. The fiber optic interface of claim 16, wherein the contact interface is a contact surface defined on the end face of the ferrule.

18. The fiber optic interface of claim 16, wherein the contact interface is a surface defined by a coating on the end face of the ferrule.

19. The fiber optic interface of claim 16, wherein the first fiber optic connector further comprises a collar, wherein the contact interface is a surface defined by the collar.

20. The fiber optic interface of claim 16, wherein the contact interface is a contact edge defined along a peripheral edge of the end face of the ferrule of the first fiber optic connector.

21. A fiber optic interface for optical testing, comprising:
a first fiber optic connector, comprising:
a ferrule extending from a distal end to a proximal end along a longitudinal direction, the ferrule comprising a contact interface defined at the proximal end of the ferrule; and
a first optical fiber extending within the ferrule along the longitudinal direction and terminating at a first fiber end, the first fiber end spaced apart from the contact interface towards the distal end of the ferrule along the longitudinal direction by a first distance, wherein the distance is at least five microns;
a third optical fiber extending within the ferrule along the longitudinal direction and terminating at a third fiber end, the third fiber end spaced apart from the contact surface towards the distal end of the ferrule along the longitudinal direction by a second distance, wherein the second distance is at least five microns and is not equal to the first distance; and
a second fiber optic connector configured to mate with the first fiber optic connector, the second fiber optic connector comprising a second optical fiber configured for optical communication with the first optical fiber when the second fiber optic connector is mated with the first fiber optic connector, the second optical fiber extending within the second fiber optic connector and terminating at a second fiber end;
wherein the ferrule of the first fiber optic connector comprises an end face which faces the second fiber optic connector when the second fiber optic connector is mated with the first fiber optic connector and wherein the end face of the ferrule of the first fiber optic connector consists of a single face.

22. The fiber optic interface of claim 21, wherein the first fiber optic connector further comprises a collar, wherein the contact interface is a surface defined by the collar.

23. The fiber optic interface of claim 21, wherein the contact interface is a contact edge defined along a peripheral edge of the end face of the ferrule of the first fiber optic connector.

24. The fiber optic interface of claim 21, wherein the contact interface is a contact surface defined on the end face of the ferrule.

25. The fiber optic interface of claim 21, wherein the contact interface is a surface defined by a coating on the end face of the ferrule.

* * * * *